(12) United States Patent
Tsukagoshi

(10) Patent No.: US 11,317,055 B2
(45) Date of Patent: *Apr. 26, 2022

(54) TRANSMISSION APPARATUS, TRANSMISSION METHOD, RECEPTION APPARATUS, AND RECEPTION METHOD

(71) Applicant: SATURN LICENSING LLC, New York, NY (US)

(72) Inventor: Ikuo Tsukagoshi, Tokyo (JP)

(73) Assignee: SATURN LICENSING LLC, New York, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 16/937,153

(22) Filed: Jul. 23, 2020

(65) Prior Publication Data

US 2020/0358980 A1    Nov. 12, 2020

Related U.S. Application Data

(63) Continuation of application No. 15/768,971, filed as application No. PCT/JP2017/035162 on Sep. 28, 2017, now Pat. No. 10,757,361.

(30) Foreign Application Priority Data

Oct. 11, 2016  (JP) .............................. JP2016-200179

(51) Int. Cl.
*H04N 7/08*     (2006.01)
*H04N 7/173*    (2011.01)
(Continued)

(52) U.S. Cl.
CPC ............. *H04N 7/025* (2013.01); *H04N 5/202* (2013.01); *H04N 5/278* (2013.01); *H04N 5/57* (2013.01);
(Continued)

(58) Field of Classification Search
CPC ........ H04N 7/025; H04N 5/202; H04N 5/278; H04N 5/57; H04N 9/64; H04N 21/235; H04N 21/435; H04N 21/4884
See application file for complete search history.

(56) References Cited

U.S. PATENT DOCUMENTS 6,661,467 B1 * 12/2003 Van Der Meer ..... A61K 9/1278
                                                       348/564
7,002,605 B1     2/2006 Katsuyama et al.
(Continued)

FOREIGN PATENT DOCUMENTS

CN         1642235 A       7/2005
CN         1879403 A      12/2006
(Continued)

OTHER PUBLICATIONS

Japanese International Search Report dated Dec. 26, 2017 in PCT/JP2017/035162 filed Sep. 28, 2017 (with translation of categories).
(Continued)

*Primary Examiner* — Kyu Chae
(74) *Attorney, Agent, or Firm* — Oblon, McClelland, Maier & Neustadt, L.L.P.

(57) ABSTRACT

A processing load on a reception side when subtitle graphics data is superimposed on video data is alleviated.
A video stream including video data is generated. A subtitle stream including bitmap data is generated, the bitmap data being obtained by converting subtitle graphics data. A container having a predetermined format containing the video stream and the subtitle stream is transmitted. The subtitle stream includes a bitmap conversion table containing conversion information of a color gamut and/or a luminance. On the reception side, subtitle graphics data having characteristics matched with those of target video data of a superimposition destination can be easily obtained
(Continued)

by just converting the bitmap data to the subtitle graphics data by using the bitmap conversion table.

20 Claims, 14 Drawing Sheets

(51) Int. Cl.
    *H04N 7/025* (2006.01)
    *H04N 5/57* (2006.01)
    *H04N 9/64* (2006.01)
    *H04N 21/435* (2011.01)
    *H04N 5/202* (2006.01)
    *H04N 21/488* (2011.01)
    *H04N 21/235* (2011.01)
    *H04N 5/278* (2006.01)

(52) U.S. Cl.
    CPC ............. *H04N 9/64* (2013.01); *H04N 21/235* (2013.01); *H04N 21/435* (2013.01); *H04N 21/4884* (2013.01)

(56) References Cited

U.S. PATENT DOCUMENTS

| | | | |
|---|---|---|---|
| 10,382,834 B2* | 8/2019 | Tsukagoshi | H04N 21/2362 |
| 10,757,361 B2* | 8/2020 | Tsukagoshi | H04N 9/64 |
| 2009/0154796 A1 | 6/2009 | Gupta et al. | |
| 2009/0154798 A1 | 6/2009 | Mizukura et al. | |
| 2010/0247075 A1 | 9/2010 | Nakata et al. | |
| 2013/0222542 A1 | 8/2013 | Tsukagoshi | |
| 2014/0125696 A1* | 5/2014 | Newton | G09G 5/377 |
| | | | 345/629 |
| 2016/0063949 A1 | 3/2016 | Tsuchida | |
| 2016/0080714 A1 | 3/2016 | Tsukagoshi | |
| 2017/0200464 A1 | 7/2017 | Yahata et al. | |
| 2018/0054660 A1* | 2/2018 | Hwang | H04N 21/234 |

FOREIGN PATENT DOCUMENTS

| | | |
|---|---|---|
| CN | 101822044 A | 9/2010 |
| CN | 101917557 A | 12/2010 |
| CN | 102483858 A | 5/2012 |
| CN | 105165001 A | 12/2015 |
| CN | 3 022 935 | 5/2016 |
| CN | 105981391 A | 9/2016 |
| CN | 108370451 A | 8/2018 |
| JP | 2009-94646 A | 4/2009 |
| JP | 2009-94846 A | 4/2009 |
| JP | 2009-147580 A | 7/2009 |
| JP | 2011-30180 A | 2/2011 |
| JP | 2016-81553 A | 5/2016 |
| KR | 10-0725248 B1 | 6/2007 |
| WO | WO 2013/031549 A1 | 3/2013 |
| WO | WO 2014/178286 A1 | 11/2014 |
| WO | WO 2015/00791 A1 | 1/2015 |
| WO | WO 2016/132976 A1 | 8/2016 |

OTHER PUBLICATIONS

Extended European Search Report dated Oct. 30, 2018 in European Patent Application No. 17859926.2, citing documents AX, AY, and AZ therein, 7 pages.
DVB Subtitling Systems, DVB TM-SUB0145: First Working Draft, DVB. Digital Video Broadcasting, ESTI EN 300 743 V1.6.1 (2016-XX), Sep. 10, 2016, XP017852288, pp. 1-67.
DVB Organization: "TM-SUB0152_BM-SUB-rendering-i ssues.pdf", DVB, Digital Video Broadcasting, Sep. 15, 2016, XP017852298, pp. 1-3.
DVB Subtitling Systems, DVB TM-SUB0145r23, Working Draft , Clean Version of r22, DVB, Digital Video Broadcasting, ETSI EN 300 743 v1.6.1 (2017-XX), Sep. 18, 2017, XP017854599, pp. 1-81.
Tsukagoshi, Ikuo (SONY): "Proposal for Rendering Subtitles on UHD HDR Video", TM-SUB0163, XP017853119, Nov. 10, 2016, 7 pages.
Digital Video Broadcasting (DVB); Subtitling System, ETSI EN 300 743 V1.3.1, Nov. 2006, pp. 1-51.

* cited by examiner

Conversion target example other than conversion
from bitmap to Y/CbCr in conversion table

| Subtitle graphics data | Target video data | Conversion target |
|---|---|---|
| SDR | SDR | Color gamut |
| SDR | HDR | Color gamut, Luminance |
| HDR | SDR | Color gamut, Luminance |
| HDR | HDR | --- |

FIG.3

(1) Case where subtitle graphics data before conversion to bitmap data is SDR and target video data is SDR (case where color gamut is identical)

(2) Case where subtitle graphics data before conversion to bitmap data is SDR and target video data is SDR (case where color gamut is different)

(3) Case where subtitle graphics data before conversion to bitmap data is SDR and target video data is HDR (4) Case where subtitle graphics data before conversion to bitmap data is HDR and target video data is SDR (5) Case where subtitle graphics data before conversion to bitmap data is HDR and target video data is HDR

FIG.4

WC segment Syntax

| Syntax | No. of Bits | Format |
|---|---|---|
| WC Segment( ) { | | |
| sync_byte | 8 | bslbf |
| segment_type | 8 | bslbf |
| page_id | 16 | bslbf |
| segment_length | 16 | bslbf |
| CLUT_id | 8 | uimsbf |
| CLUT_version_number | 4 | uimsbf |
| reserved | 4 | bslbf |
| while ( processed_length < segment_length ) { | | |
| CLUT_entry_id | 8 | uimsbf |
| entry_CLUT_type | 4 | uimsbf |
| output_depth | 2 | bslbf |
| subtitle_dynamic_range_type | 2 | bslbf |
| subtitle_color_gamut | 2 | bslbf |
| target_video_dynamic_range_type | 2 | bslbf |
| target_video_color_gamut | 2 | bslbf |
| reserved | 2 | bslbf |

FIG.8

WC segment Syntax (continued)

| Syntax | No. of Bits | Format |
|---|---|---|
| for ( j = 0 ; j < 2^entry_CLUT_type ; j++ ) { | | |
| if (output_depth == 0x1) { | | |
| Y-value | 8 | uimsbf |
| Cr-value | 8 | uimsbf |
| Cb-value | 8 | uimsbf |
| T-value | 8 | uimsbf |
| } else if (output_depth == 0x2) { | | |
| Y-value | 10 | uimsbf |
| Cr-value | 10 | uimsbf |
| Cb-value | 10 | uimsbf |
| T-value | 10 | uimsbf |
| } else if (output_depth == 0x3) { | | |
| Y-value | 12 | uimsbf |
| Cr-value | 12 | uimsbf |
| Cb-value | 12 | uimsbf |
| T-value | 12 | uimsbf |
| } else { | | |
| } | | |
| } | | |
| } | | |

FIG.9 entry_CLUT_type
        Representing type of entry_CLUT
        (variation of display color)
        0x1        2bit entry
        0x2        4bit entry
        0x4        8bit entry
output_depth
        1        8bit
        2        10bit
        3        12bit
Subtitle_dynamic_range_type
        1        SDR by gamma
        2        HDR by PQ
        3        HDR by HLG Subtitle_Color_Gamut
        1        BT.709
        2        BT.2020
Target_Video_dynamic_range_type
        1        SDR by gamma
        2        HDR by PQ
        3        HDR by HLG
Target_Video_Color_Gamut
        1        BT.709
        2        BT.2020

FIG.10

Variation of conversion table included in subtitle transmission

| Clut_entry_id | 1 | 2 | 3 | 4 | 5 |
|---|---|---|---|---|---|
| Entry_CLUT_type | 4 | 4 | 4 | 4 | 4 |
| Output_depth | 2 | 2 | 2 | 2 | 2 |
| Subtilte_Dynamic_range_type | 1 | 1 | 1 | 2 | 2 |
| Subtitle_Color_gamut | 1 | 1 | 1 | 2 | 2 |
| TargetVideo_Dynamic_range_type | 1 | 1 | 3 | 1 | 3 |
| TargetVideo_Color_gamut | 1 | 2 | 2 | 2 | 2 |
| Table Data | | | | | |

FIG.11

Syntax of "Rendering_guide_segment"

(a)

| Syntax | Size | Type |
|---|---|---|
| Rendering_guide_segment(){ | | |
| sync_byte | 8 | bslbf |
| segment_type | 8 | bslbf |
| page_id | 16 | uimsbf |
| segment_length | 16 | uimsbf |
| rgs_version_number | 4 | uimsbf |
| reserved | 3 | bslbf |
| rendering_conversion_guide | 1 | bslbf |
| bitmap_data_color_gamut_information | 8 | uimsbf |
| bitmap_data_dynamic_range_information | 8 | uimsbf |
| } | | |
| } | | |

(b)

```
rendering_conversion_guide(1)
    Representing need to adjust color gamut or dynamic range to video in rendering.
    1    Conversion is made possible by selecting matched one from plurality of bitmap conversion tables (CLUT).
    0    Others
bitmap_data_color_gamut_information(8)
    Information representing color gamut of subtitle graphics data and having semantics defined by HEVC standard.
bitmap_data_dynamic_range_information(8)
    Information representing dynamic range of subtitle graphics data and having semantics defined by HEVC standard.
```

FIG.12

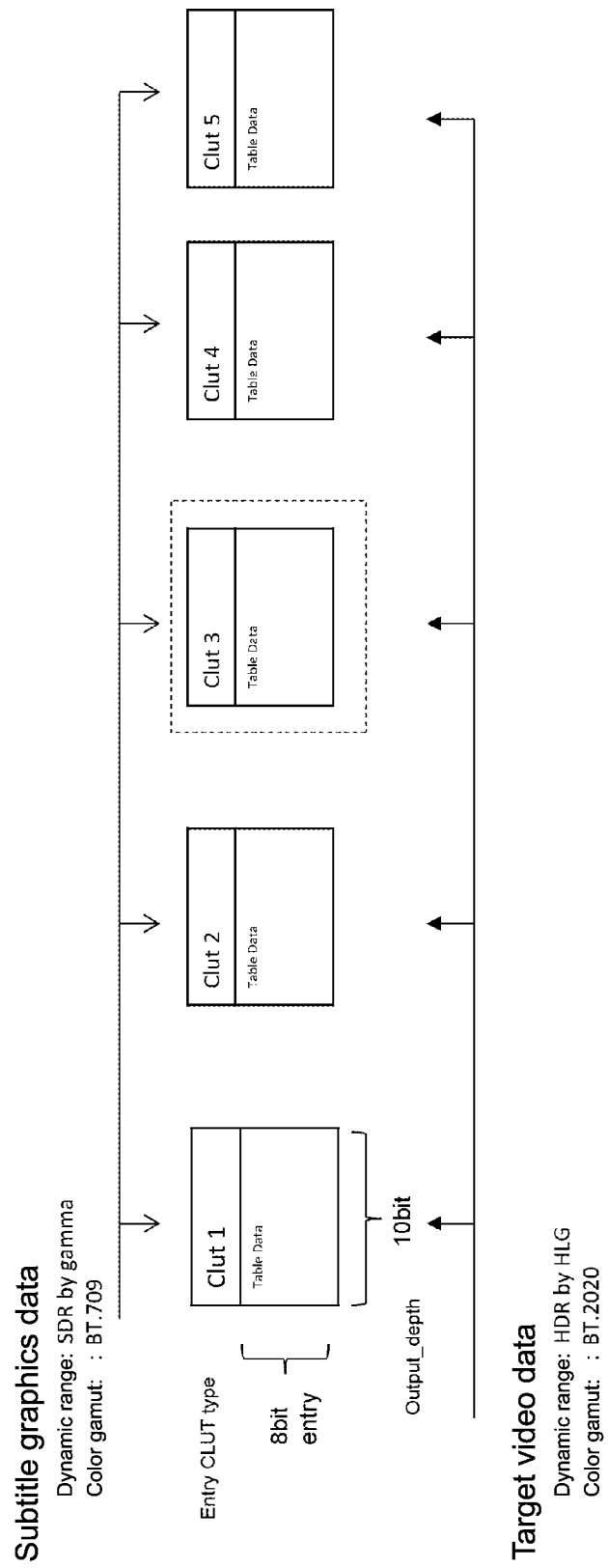

TRANSMISSION APPARATUS, TRANSMISSION METHOD, RECEPTION APPARATUS, AND RECEPTION METHOD

CROSS REFERENCE TO RELATED APPLICATIONS

This application is a continuation of U.S. Ser. No. 15/768,971 filed Apr. 17, 2018, which is a National Stage of PCT/JP2017/035162, filed Sep. 28, 2017 and claims the benefit of Japanese Priority Patent Application JP 2016-200179 filed on Oct. 11, 2016. The entire contents of U.S. Ser. No. 15/768,971 are incorporated herein by reference.

TECHNICAL FIELD

The present technology relates to a transmission apparatus, a transmission method, a reception apparatus, and a reception method, and more particularly to, a transmission apparatus that transmits subtitle information in bitmap data, and the like.

BACKGROUND ART

In the past, for example, in broadcasting such as DVB (Digital Video Broadcasting), the operation in which subtitle graphics data is converted to bitmap data and then transmitted has been performed (see, for example, Patent Literature 1).

CITATION LIST

Patent Literature

Patent Literature 1: Japanese Patent Application Laid-open No. 2011-030180

DISCLOSURE OF INVENTION

Technical Problem

In the past, when video data and subtitle graphics data are transmitted in different streams, there has not been a noticeable difference between them regarding a color gamut and a luminance. Therefore, at the time of superimposition, synthesizing is performed without special consideration.

For example, in a case where the color gamut of the video data is wide (e.g., in conformity to ITU-R Rec Bt.2020) and the color gamut of the subtitle graphics data is narrow (e.g., sRGB), in order to keep the image quality of the video high, it becomes necessary to adjust the color gamut of the subtitle graphics data to the color gamut of the video data before performing superimposition.

Further, for example, in a case where the video data is produced with a high dynamic range (HDR) and the subtitle graphics data is produced with a dynamic range of a standard level (SDR), in order to keep the image quality of the video high, it becomes necessary to match the subtitle graphics data with the dynamic range region of the video data before performing superimposition.

It is an object of the present technology to alleviate a processing load on a reception side when subtitle graphics data is superimposed on video data.

Solution to Problem

A concept of the present technology resides in a transmission apparatus including: a video encoder section that generates a video stream including video data; a subtitle encoder section that generates a subtitle stream including bitmap data, the bitmap data being obtained by converting subtitle graphics data; and a transmission section that transmits a container having a predetermined format containing the video stream and the subtitle stream, the subtitle stream including a bitmap conversion table containing conversion information of a color gamut and/or a luminance.

In the present technology, a video stream including video data is generated by a video encoder section. A subtitle stream including bitmap data is generated by a subtitle encoder section, the bitmap data being obtained by converting subtitle graphics data. A container having a predetermined format containing the video stream and the subtitle stream is transmitted by a transmission section.

The subtitle stream is adapted to include a bitmap conversion table containing conversion information of a color gamut and/or a luminance. For example, the subtitle stream may be adapted to include a plurality of bitmap conversion tables each containing the conversion information different from one another. In this case, for example, each of the plurality of bitmap conversion tables may be adapted to additionally contain matching characteristic information of the subtitle graphics data and target video data.

In such a manner, in the present technology, the subtitle stream includes a bitmap conversion table containing conversion information of a color gamut and/or a luminance. Therefore, the reception side can easily obtain subtitle graphics data having characteristics matched with those of target video data of a superimposition destination by just converting bitmap data to subtitle graphics data by using the bitmap conversion table. This enables a processing load on the reception side to be alleviated.

It should be noted that in the present technology, for example, the transmission apparatus may further include an information insertion section that inserts characteristic information of the subtitle graphics data before conversion to the bitmap data into the subtitle stream. Thus, on the reception side, the characteristic of the subtitle graphics data before conversion to the bitmap data can be easily grasped.

Further, another concept of the present technology resides in a reception apparatus including: a reception section that receives a container having a predetermined format containing a video stream and a subtitle stream, the video stream including video data, the subtitle stream including bitmap data obtained by converting subtitle graphics data, the subtitle stream including a bitmap conversion table containing conversion information of a color gamut and/or a luminance; and a control section that controls processing of decoding the video stream to obtain target video data, processing of decoding the subtitle stream to obtain the bitmap data and the bitmap conversion table, processing of converting the bitmap data to the subtitle graphics data by using the bitmap conversion table, and processing of superimposing the subtitle graphics data on the target video data.

In the present technology, a container having a predetermined format containing a video stream and a subtitle stream is received by a reception section, the video stream including video data, the subtitle stream including bitmap data obtained by converting subtitle graphics data. The subtitle stream includes a bitmap conversion table containing conversion information of a color gamut and/or a luminance.

Processing of decoding the video stream to obtain target video data and processing of decoding the subtitle stream to obtain the bitmap data and the bitmap conversion table are performed. Processing of converting the bitmap data to the subtitle graphics data by using the bitmap conversion table and processing of superimposing the subtitle graphics data on the target video data are performed.

For example, the subtitle stream may be adapted to include a plurality of bitmap conversion tables each containing the conversion information different from one another, and in the processing of converting the bitmap data to the subtitle graphics data, out of the plurality of bitmap conversion tables, a bitmap conversion table matched with characteristics of the subtitle graphics data before conversion to the bitmap data and the target video data may be adapted to be used.

In this case, for example, characteristic information of the subtitle graphics data before conversion to the bitmap data may be adapted to be inserted into the subtitle stream, and in the processing of converting the bitmap data to the subtitle graphics data, the characteristic of the subtitle graphics data before conversion to the bitmap data may be adapted to be determined on the basis of the characteristic information inserted into the subtitle stream.

In such a manner, in the present technology, in the processing of converting the bitmap data to the subtitle graphics data, a bitmap conversion table containing conversion information of a color gamut and/or a luminance, which is inserted into the subtitle stream, is used. Therefore, subtitle graphics data having characteristics matched with those of target video data of a superimposition destination can be easily obtained. This enables a processing load to be alleviated.

It should be noted that in the present technology, for example, in the processing of converting the bitmap data to the subtitle graphics data, when the bitmap conversion table is not matched with characteristics of the subtitle graphics data before conversion to the bitmap data and the target video data, the bitmap data may be adapted to be converted to the subtitle graphics data to be matched with the characteristics without using the bitmap conversion table in the processing of the reception apparatus. In this case, subtitle graphics data having characteristics matched with those of target video data of a superimposition destination can be obtained, and thus the lowering of the image quality of a video can be suppressed.

Advantageous Effects of Invention

According to the present technology, it is possible to alleviate a processing load on a reception side when subtitle graphics data is superimposed on video data. It should be noted that the effects described in this specification are merely examples and are not limitative, and additional effects may be provided.

BRIEF DESCRIPTION OF DRAWINGS

FIG. 3 is a diagram showing another conversion target example other than conversion from bitmap data to subtitle graphics data (Y/CbCr) in a bitmap conversion table.

FIG. 4 is a diagram for describing information of the bitmap conversion table.

FIG. 8 is a diagram (1/2) showing a structural example of a WC segment.

FIG. 9 is a diagram (2/2) showing the structural example of the WC segment.

FIG. 10 is a diagram showing contents of main information in the structural example of the WC segment.

FIG. 11 is a diagram showing examples of values of "CLUT_entry_id", "entry_CLUT_type", and "output depth" and values of matching characteristic information in a list.

FIG. 12 is a diagram showing a structural example of a rendering guide segment and contents of main information in that structural example.

FIG. 15 is a diagram showing a selection example of a bitmap conversion table (CLUT).

MODE(S) FOR CARRYING OUT THE INVENTION

Hereinafter, a mode for carrying out the present invention (hereinafter, referred to as "embodiment") will be described. It should be noted that description will be given in the following order.

1. Embodiment
2. Modified Example

1. Embodiment

[Configuration Example of Transmission and Reception System]

Figure 1:
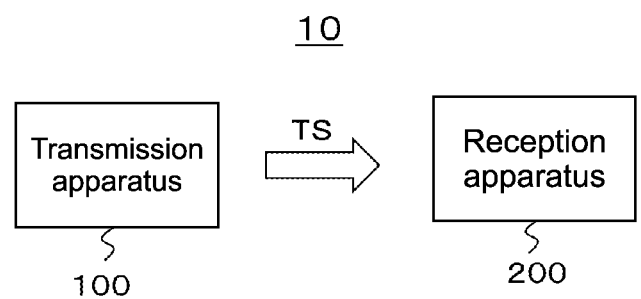
FIG. 1 is a block diagram showing a configuration example of a transmission and reception system as an embodiment.

FIG. 1 shows a configuration example of a transmission and reception system 10 as an embodiment. This transmission and reception system 10 includes a transmission apparatus 100 and a reception apparatus 200.

The transmission apparatus 100 generates an MPEG2 transport stream TS as a container and transmits the transport stream TS through broadcasting waves or network packets. This transport stream TS contains a video stream including video data (image data).

Further, this transport stream TS contains a subtitle stream including bitmap data, which is obtained by converting subtitle graphics data as subtitle data. This subtitle stream is considered as including a bitmap conversion table containing a color gamut and/or a luminance, in this embodiment, conversion information of both of them.

The subtitle stream is considered as including a predetermined number of bitmap conversion tables, i.e., one or two or more bitmap conversion tables. In such a case, each bitmap conversion table is additionally provided with matching characteristic information of subtitle graphics data and target video data. Here, the characteristic(s) is/are a color gamut and/or a dynamic range, in this embodiment, the characteristics of both of them. Thus, on the reception side, it is possible to easily determine which bitmap conversion table is to be used.

Further, in this embodiment, the characteristic information of subtitle graphics data before conversion to bitmap data is inserted into the subtitle stream. Thus, on the reception side, the characteristic of subtitle graphics data before conversion to bitmap data can be easily grasped.

The reception apparatus 200 receives the transport stream TS transmitted from the transmission apparatus 100. The reception apparatus 200 performs decoding processing on the video stream and obtains target video data. In this case, for the target video data, not only the video data transmitted from the transmission side but also video data obtained by performing conversion processing of a color gamut or a dynamic range thereon as appropriate are conceived.

Further, the reception apparatus 200 performs decoding processing on the subtitle stream, obtains bitmap data and a bitmap conversion table, and converts the bitmap data to subtitle graphics data by using the bitmap conversion table. Here, in a case where a plurality of bitmap conversion tables each containing different conversion information are obtained, a bitmap conversion table matched with the characteristics of the subtitle graphics data before conversion to bitmap data and the target video data is used. In this case, the characteristic of the subtitle graphics data before conversion to bitmap data is grasped from, for example, the characteristic information inserted into the subtitle stream.

The reception apparatus 200 then superimposes the subtitle graphics data on the target video data, the subtitle graphics data being obtained by converting bitmap data. With the video data on which the subtitle graphics data is superimposed in such a manner, an image with subtitles is displayed on the monitor.

"Configuration Example of Transmission Apparatus"

Figure 2:
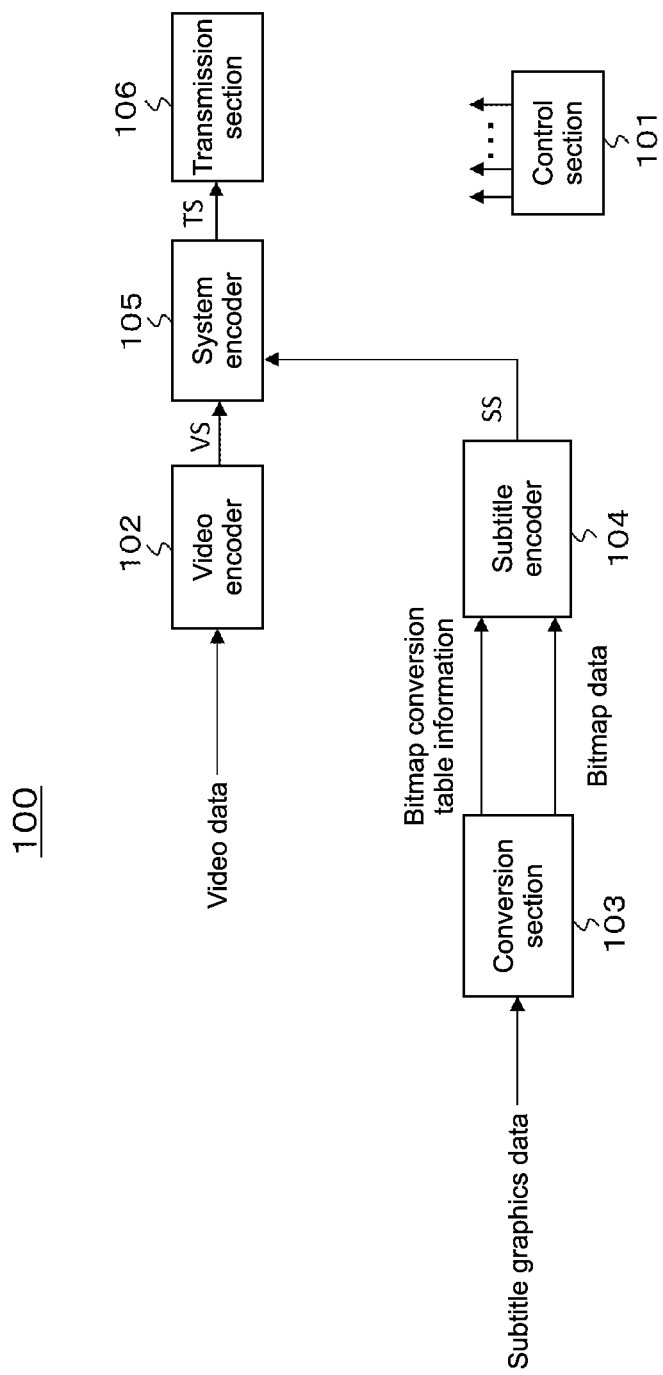
FIG. 2 is a block diagram showing a configuration example of a transmission apparatus.

FIG. 2 shows a configuration example of the transmission apparatus 100. This transmission apparatus 100 includes a control section 101, a video encoder 102, a conversion section 103, a subtitle encoder 104, a system encoder 105, and a transmission section 106.

The control section 101 includes a CPU (Central Processing Unit) and controls operations of the respective sections of the transmission apparatus 100 on the basis of a control program. The video encoder 102 performs encoding such as MPEG4-AVC or HEVC on the video data and generates a video stream (PES stream) VS containing the encoded video data.

Here, the video data is SDR (Standard Dynamic Range) or HDR (High Dynamic Range) data and is provided with an SDR or HDR opto-electronic conversion characteristic. The video encoder 102 inserts characteristic information of the video data, i.e., meta-information such as information of a color gamut or a dynamic range, into a region of VUI (video usability information) of an SPS NAL unit of an access unit (AU).

The conversion section 103 converts the subtitle graphics data to bitmap data. Here, the subtitle graphics data is SDR or HDR data and is provided with an SDR or HDR opto-electronic conversion characteristic. The conversion section 103 refers to an HDR or SDR level, which is assumed to be necessary on the reception side, to thus output information of one or two or more bitmap conversion tables together with the bitmap data.

Here, the bitmap conversion table is a bitmap conversion table containing conversion information of a color gamut and/or a luminance. In other words, the bitmap conversion table is not for simply converting the bitmap data into the subtitle graphics data but for converting a color gamut or a luminance together so as to be adjusted to a color gamut or a dynamic range of the target video data that is video data of a superimposition destination.

FIG. 3 shows a conversion target example other than the conversion from the bitmap data to the subtitle graphics data (Y/CbCr) in the bitmap conversion table. In a case where the subtitle graphics data before conversion to the bitmap data is SDR and the target video data is SDR, the color gamut can be another conversion target. For example, when the color gamut of the subtitle graphics data is BT.709 and the color gamut of the target video data is BT.2020, the color gamut becomes a conversion target.

Further, in a case where the subtitle graphics data before conversion to the bitmap data is SDR and the target video data is HDR, the color gamut and the luminance can be conversion targets. Further, in a case where the subtitle graphics data before conversion to the bitmap data is HDR and the target video data is SDR, the color gamut and the luminance can be conversion targets. It should be noted that in a case where the subtitle graphics data before conversion to the bitmap data is HDR and the target video data is HDR, the color gamut and the dynamic range are common, and thus there is nothing that can be a conversion target.

In this embodiment, the conversion section 103 outputs information of the bitmap conversion table used in each of the cases (1) to (5) of FIG. 4. The case (1) is a case where the subtitle graphics data before conversion to the bitmap data is SDR and the target video data is SDR (a case where the color gamut is identical). The case (2) is a case where the subtitle graphics data before conversion to the bitmap data is SDR and the target video data is SDR (a case where the color gamut is different).

The case (3) is a case where the subtitle graphics data before conversion to the bitmap data is SDR and the target video data is HDR. The case (4) is a case where the subtitle graphics data before conversion to the bitmap data is HDR and the target video data is SDR. The case (5) is a case where the subtitle graphics data before conversion to the bitmap data is HDR and the target video data is HDR.

The conversion functions, which are necessary on the reception side, and thus the conversion functions of the bitmap conversion table in the cases (1) to (5) will be described in detail with reference to FIG. 5. The conversion functions necessary at maximum on the reception side include the following first to seventh conversion functions. The processing in those conversion functions is basically independent on a pixel by pixel basis.

A first conversion function 301 is a function of converting bitmap data to subtitle graphics data. A second conversion function 302 is a function of converting a domain of the subtitle graphics data, which is converted from the bitmap data, from YCbCr to RGB1. A third conversion function 303 is a function of performing electro-optical conversion by applying an electro-optical conversion characteristic so as to change the subtitle graphics data, which is converted from the bitmap data, to a luminance linear space.

A fourth conversion function 304 is a function of converting a luminance level in order to eliminate inconvenience due to a difference in dynamic range between the subtitle graphics data converted from the bitmap data and the target video data. A fifth conversion function 305 is a function of performing color gamut conversion (RGB1 to RGB2) for adjusting the color gamut of the subtitle graphics data converted from the bitmap data to the color gamut of the target video data.

A sixth conversion function 306 is a function of performing opto-electronic conversion by applying an opto-electronic conversion characteristic, which is identical to that of the target video data, to the subtitle graphics data in the luminance linear space. A seventh conversion function 307 is a function of converting a domain of the subtitle graphics data from RGB2 to YCbCr.

The case (1) needs the first conversion function 301 only. In this case, the bitmap data is converted to the subtitle graphics data by the first conversion function 301, and this graphics data becomes output graphics data as it is. In this case, each of the subtitle graphics data before the conversion to the bitmap data and the target video data is SDR, and their color gamut are identical, and thus the second conversion function 302 to the seventh conversion function 307 are bypassed. This conversion processing is exactly identical to the processing performed in the broadcasting as a traditional legacy.

The case (2) needs the first conversion function 301, the second conversion function 302, the fifth conversion function 305, and the seventh conversion function 307. In this case, the bitmap data is converted to the subtitle graphics data by the first conversion function 301. This subtitle graphics data is converted from a YCbCr domain to an RGB1 domain by the second conversion function 302.

The color gamut of the subtitle graphics data that is converted to the RGB1 domain is converted so as to be adjusted to the color gamut of the target video data by the fifth conversion function 305. For example, the color gamut of BT.709 of the subtitle graphics data is converted so as to be adjusted to BT.2020 as the color gamut of the target video data.

The subtitle graphics data whose color gamut has been converted is converted from an RGB2 domain to the YCbCr by the seventh conversion function 307, and this graphics data becomes output graphics data. In this case, each of the subtitle graphics data before the conversion to the bitmap data and the target video data is SDR, and thus the third conversion function 303, the fourth conversion function 304, and the sixth conversion function 306 are bypassed.

The case (3) needs all of the first conversion function 301 to the seventh conversion function 307. In this case, the bitmap data is converted to the subtitle graphics data by the first conversion function 301. This subtitle graphics data is converted from the YCbCr domain to the RGB1 domain by the second conversion function 302.

The subtitle graphics data converted to the RGB1 domain is subjected to electro-optical conversion by applying an SDR electro-optical conversion characteristic by the third conversion function 303, to thus be changed to a luminance linear space. The subtitle graphics data changed to the luminance linear space is subjected to luminance level conversion by the fourth conversion function 304. In this case, conversion is performed such that a predetermined SDR luminance level becomes an HDR mapping reference level.

Figure 6:
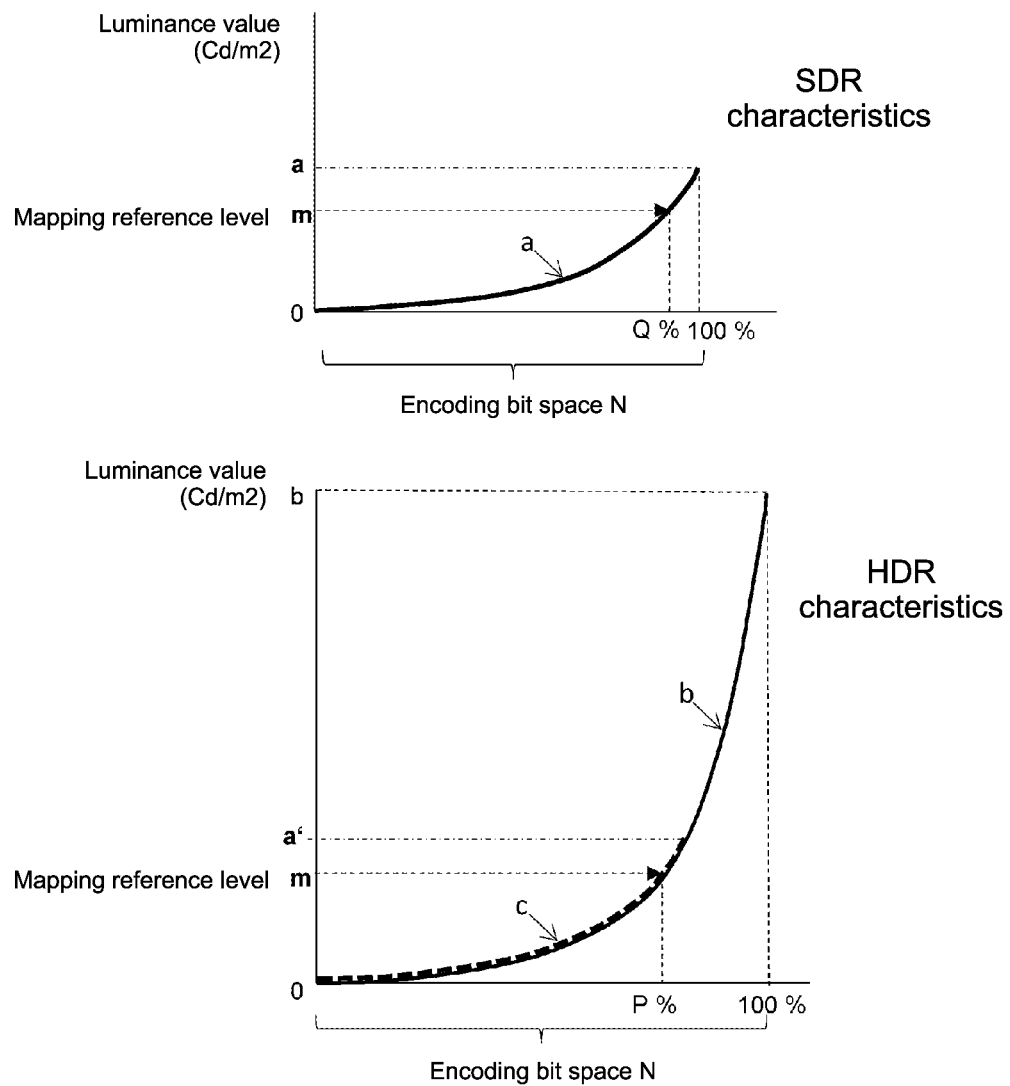
FIG. 6 is a diagram for describing a luminance level conversion from SDR to HDR.

FIG. 6 shows a state of this luminance level conversion. In FIG. 6, the solid line a represents an SDR conversion curve. The solid line b represents an HDR conversion curve. The broken line c represents an SDR data range that is mapped on the HDR conversion curve.

In this case, a luminance value "m" of SDR subtitle graphics data is treated as a mapping reference value that coincides with a luminance value "m" of HDR video data. Assuming that an encoding code value representing the luminance value "m" of the SDR subtitle graphics data is Q % and an encoding code value representing the luminance value "m" of the HDR video data is P %, the SDR subtitle graphics data is converted such that a digital code representing Q % coincides with a digital code representing P %.

In such a manner, [0 ... a] of the SDR subtitle graphics data falls within the range of [0 ... a'] of the HDR video data. Thus, the luminance of subtitles is prevented from being too bright. It should be noted that, in the figure, in both of the SDR and the HDR, an encoding bit space N is the same. Further, 0<P≤100, and 0<Q≤100.

As described above, the subtitle graphics data, which has been subjected to the luminance level conversion by the fourth conversion function 304, is converted so as to be adjusted to the color gamut of the target video data by the fifth conversion function 305. For example, the color gamut of BT.709 of the subtitle graphics data is converted so as to be adjusted to BT.2020 as the color gamut of the target video data.

The subtitle graphics data whose color gamut has been converted is subjected to opto-electronic conversion by applying an HDR opto-electronic conversion characteristic by the sixth conversion function 306. Thus, the subtitle graphics data is provided with the HDR opto-electronic conversion characteristic, like the target video data. This subtitle graphics data is converted from the RGB2 domain to the YCbCr by the seventh conversion function 307, and this graphics data becomes output graphics data.

The case (4) needs all of the first conversion function 301 to the seventh conversion function 307 as in the case (3) described above. In this case, the bitmap data is converted to the subtitle graphics data by the first conversion function 301. This subtitle graphics data is converted from the YCbCr domain to the RGB1 domain by the second conversion function 302.

The subtitle graphics data converted to the RGB1 domain is subjected to electro-optical conversion by applying an HDR electro-optical conversion characteristic by the third conversion function 303, to thus be changed to a luminance linear space. The subtitle graphics data changed to the luminance linear space is subjected to luminance level conversion by the fourth conversion function 304. In this case, conversion is performed such that a predetermined HDR luminance level becomes an SDR mapping reference level.

Figure 7:
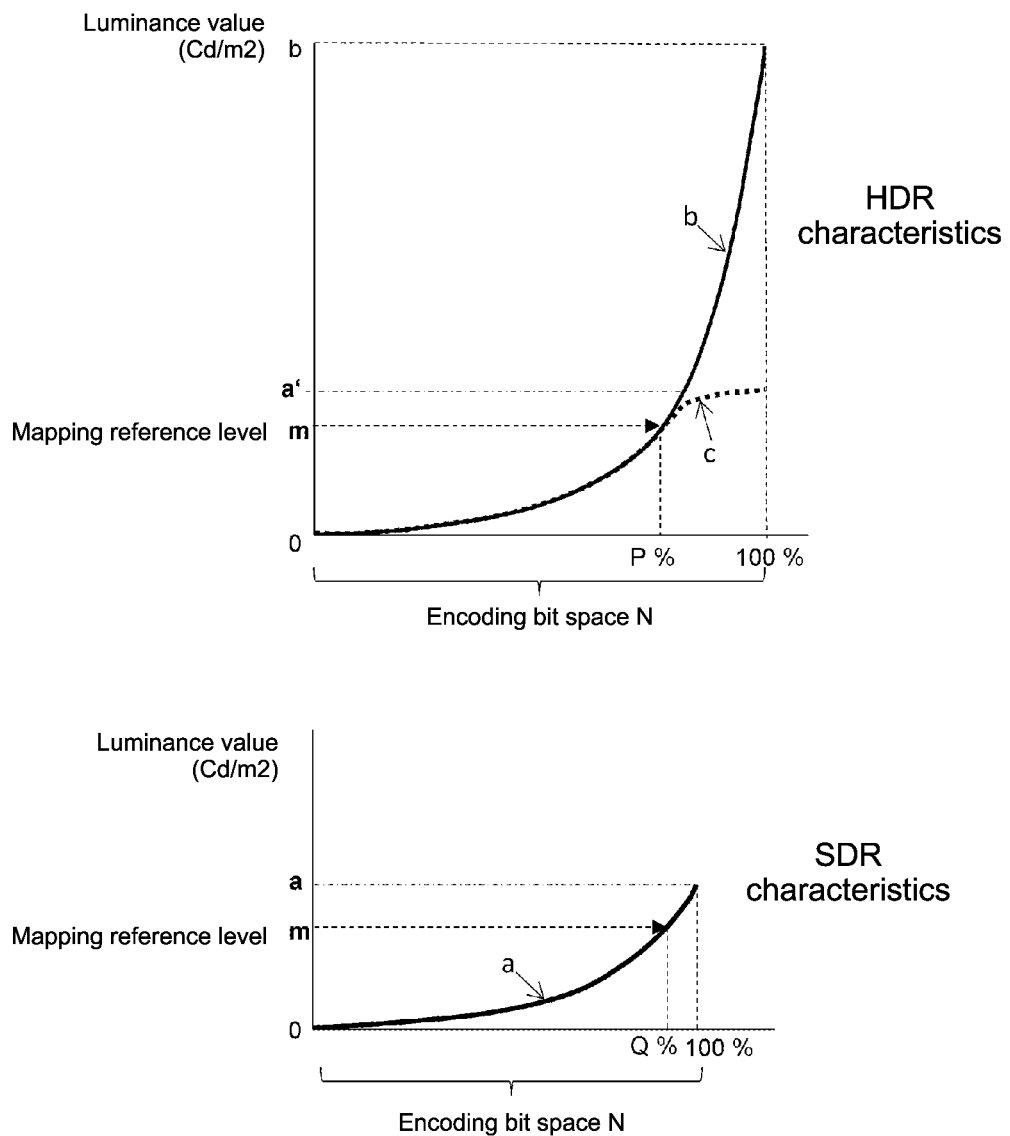
FIG. 7 is a diagram for describing a luminance level conversion from HDR to SDR.

FIG. 7 shows a state of this luminance level conversion. In FIG. 7, the solid line a represents an SDR conversion curve. The solid line b represents an HDR conversion curve. The broken line c represents a conversion curve aimed at mapping the HDR conversion curve on the SDR.

In this case, a luminance value "m" of HDR subtitle graphics data is treated as a mapping reference value that coincides with a luminance value "m" of SDR video data. Assuming that an encoding code value representing the luminance value "m" of the HDR subtitle graphics data is P % and an encoding code value representing the luminance value "m" of the SDR video data is Q %, the HDR subtitle graphics data is converted with a conversion curve having tone-map characteristics like the broken line c such that a digital code representing P % coincides with a digital code representing Q %.

In such a manner, [0 ... b] of the HDR subtitle graphics data becomes [0 ... a'] and falls within the range of [0 ... a] of the SDR video data without performing clipping. It should be noted that, in the figure, in both of the SDR and the HDR, the encoding bit space N is the same. Further, 0<P≤100, and 0<Q≤100.

As described above, the subtitle graphics data, which has been subjected to the luminance level conversion by the fourth conversion function 304, is converted so as to be adjusted to the color gamut of the target video data by the fifth conversion function 305. For example, the color gamut of BT.2020 of the subtitle graphics data is converted so as to be adjusted to BT.709 as the color gamut of the target video data.

The subtitle graphics data whose color gamut has been converted is subjected to opto-electronic conversion by applying an SDR opto-electronic conversion characteristic by the sixth conversion function 306. Thus, the subtitle graphics data is provided with the SDR opto-electronic conversion characteristic, like the target video data. This subtitle graphics data is converted from the RGB2 domain to the YCbCr by the seventh conversion function 307, and this graphics data becomes output graphics data.

The case (5) needs the first conversion function 301 only. In this case, the bitmap data is converted to the subtitle graphics data by the first conversion function 301, and this graphics data becomes output graphics data as it is. In this case, each of the subtitle graphics data before the conversion to the bitmap data and the target video data is HDR, and their color gamut are identical, and thus the second conversion function 302 to the seventh conversion function 307 are bypassed.

It should be noted that the example of the figure shows a case where the HDR characteristics of the subtitle graphics data before the conversion to the bitmap data and the target video data are the same. In a case where the HDR characteristics of both of the data are different from each other, the luminance level conversion also becomes necessary as in the cases (3) and (4). The case where the HDR characteristics of both of the data are different from each other is, for example, a case where the HDR characteristic of the subtitle graphics data is PQ and the HDR characteristic of the video data is HLG.

Referring to FIG. 2, the subtitle encoder 104 converts display control information and the bitmap data output from the conversion section 103 to various segments and generates a subtitle stream SS including PES packets in which those segments are disposed in payloads thereof. The various segments include, in addition to the conventionally well-known segments such as DDS, PCS, RCS, ODS, and EDS, a WC segment and a rendering guide segment (Rendering guide segment) that are newly defined.

The WC segment contains information of a predetermined number of bitmap conversion tables output from the conversion section 103. Further, the rendering guide segment contains characteristic information of subtitle graphics data before conversion to bitmap data, i.e., meta-information such as information of the color gamut or the dynamic range.

FIGS. 8 and 9 show a structural example (Syntax) of the WC segment, and FIG. 10 shows contents (Semantics) of main information in that structural example. An 8-bit field of "CLUT_entry_id" represents an ID of an individual CLUT (bitmap conversion table). A 4-bit field of "entry_CLUT_type" represents the type of entry-CLUT, i.e., variation of a display color and corresponds to the range of input bitmap data. For example, "0x1" represents 2 bit entry, "0x2" represents 4 bit entry, and "0x4" represents 8 bit entry.

A 2-bit field of "output depth" represents a bit depth of each element of YCrCb and T as the output graphics data. For example, "1" represents 8 bits, "2" represents 10 bits, and "3" represents 12 bits.

A 2-bit field of "subtitle_dynamic_range_type" represents information of a dynamic range that is matched as a dynamic range of the subtitle graphics data before the conversion to the bitmap data. For example, "1" represents "SDR by gamma", "2" represents "HDR by PQ", and "3" represents "HDR by HLG". A 2-bit field of "subtitle color gamut" represents information of a color gamut that is matched as a color gamut of the subtitle graphics data before the conversion to the bitmap data. For example, "1" represents "BT.709", and "2" represents "BT.2020".

A 2-bit field of the "target_video_dynamic_range_type" represents information of a dynamic range that is matched as a dynamic range of the target video data. For example, "1" represents "SDR by gamma", "2" represents "HDR by PQ", and "3" represents "HDR by HLG". A 2-bit field of "target_video_color_gamut" represents information of a color gamut that is matched as a color gamut of the target video data. For example, "1" represents "BT.709", and "2" represents "BT.2020".

In this WC segment, the fields of "CLUT_entry_id", "entry_CLUT_type", "output depth", "subtitle_dynamic_range_type", "subtitle color gamut", "target_video_dynamic_range_type", and "target video color gamut" are present in each bitmap conversion table, and the elements of YCrCb and T, which are conversion data corresponding to possible values of the input bitmap data, are present following those fields.

FIG. 11 shows examples of the values of "CLUT_entry_id", "entry_CLUT_type", and "output depth", and values of matching characteristic information ("subtitle_dynamic_range_type", "subtitle color gamut", "target_video_dynamic_range_type", "target video color gamut") in a list.

In the example shown in the figure, the value of "entry_CLUT_type" is set to "0x4", which represents 8 bit entry, i.e., indicates that the range of the input bitmap data is 8 bits. Further, in the example shown in the figure, the value of "output depth" is set to "2", which indicates that the bit depth of the elements of YCrCb and T as output graphics data is 10 bits.

Further, in the example shown in the figure, the matching characteristic information ("subtitle_dynamic_range_type", "subtitle color gamut", "target_video_dynamic_range_type", "target video color gamut") of a bitmap conversion table (CLUT) having "CLUT_entry_id" of "1" is (1, 1, 1, 1), which represents a bitmap conversion table corresponding to the case (1) described above.

In other words, this bitmap conversion table (CLUT) can be used in a case where the dynamic range of the subtitle graphics data before the conversion to the bitmap data is "SDR by gamma" and the color gamut is "BT.709", and also where the dynamic range of the target video data is "SDR by gamma" and the color gamut is "BT.709".

Further, in the example shown in the figure, the matching characteristic information ("subtitle_dynamic_range_type", "subtitle_color_gamut", "target_video_dynamic_range_type", "target video color gamut") of a bitmap conversion table (CLUT) having "CLUT_entry_id" of "2" is (1, 1, 1, 2), which represents a bitmap conversion table corresponding to the case (2) described above.

In other words, this bitmap conversion table (CLUT) can be used in a case where the dynamic range of the subtitle graphics data before the conversion to the bitmap data is "SDR by gamma" and the color gamut is "BT.709", and also where the dynamic range of the target video data is "SDR by gamma" and the color gamut is "BT.2020".

Further, in the example shown in the figure, the matching characteristic information ("subtitle_dynamic_range_type", "subtitle_color_gamut", "target_video_dynamic_range_type", "target video color gamut") of a bitmap conversion table (CLUT) having "CLUT_entry_id" of "3" is (1, 1, 3, 2), which represents a bitmap conversion table corresponding to the case (3) described above.

In other words, this bitmap conversion table (CLUT) can be used in a case where the dynamic range of the subtitle graphics data before the conversion to the bitmap data is "SDR by gamma" and the color gamut is "BT.709", and also where the dynamic range of the target video data is "HDR by HLG" and the color gamut is "BT.2020".

Further, in the example shown in the figure, the matching characteristic information ("subtitle_dynamic_range_type", "subtitle_color_gamut", "target_video_dynamic_range_type", "target video color gamut") of a bitmap conversion table (CLUT) having "CLUT_entry_id" of "4" is (2, 2, 1, 2), which represents a bitmap conversion table corresponding to the case (4) described above.

In other words, this bitmap conversion table (CLUT) can be used in a case where the dynamic range of the subtitle graphics data before the conversion to the bitmap data is "HDR by PQ" and the color gamut is "BT.2020", and also where the dynamic range of the target video data is "SDR by gamma" and the color gamut is "BT.2020".

Further, in the example shown in the figure, the matching characteristic information ("subtitle_dynamic_range_type", "subtitle_color_gamut", "target_video_dynamic_range_type", "target video color gamut") of a bitmap conversion table (CLUT) having "CLUT_entry_id" of "5" is (2, 2, 3, 2), which represents a bitmap conversion table corresponding to the case (5) described above (the case where the HDR characteristics are different).

In other words, this bitmap conversion table (CLUT) can be used in a case where the dynamic range of the subtitle graphics data before the conversion to the bitmap data is "HDR by PQ" and the color gamut is "BT.2020", and also where the dynamic range of the target video data is "HDR by HLG" and the color gamut is "BT.2020".

FIG. 12(a) shows a structural example (Syntax) of the rendering guide segment, and FIG. 12(b) shows contents (Semantics) of main information in that structural example. A 1-bit field of "rendering conversion guide" represents a need to adjust the color gamut or dynamic range to the video in the rendering where the subtitle graphics data is superimposed on the target video data. For example, "1" indicates that conversion is made possible by selecting a matched one from the plurality of bitmap conversion tables, and "0" represents others.

An 8-bit field of "bitmap data color gamut information" is information representing the color gamut of the subtitle graphics data before the conversion to the bitmap data and having the semantics defined by the HEVC standard. An 8-bit field of "bitmap data dynamic range information" is information representing the dynamic range of the subtitle graphics data before the conversion to the bitmap data and having the semantics defined by the HEVC standard.

Referring back to FIG. 2, the system encoder 105 generates a transport stream TS containing a video stream VS generated in the video encoder 102 and a subtitle stream SS generated in the subtitle encoder 104. The transmission section 106 transmits this transport stream TS to the reception apparatus 200 through broadcasting waves or network packets.

"Configuration Example of Transport Stream TS"

Figure 13:
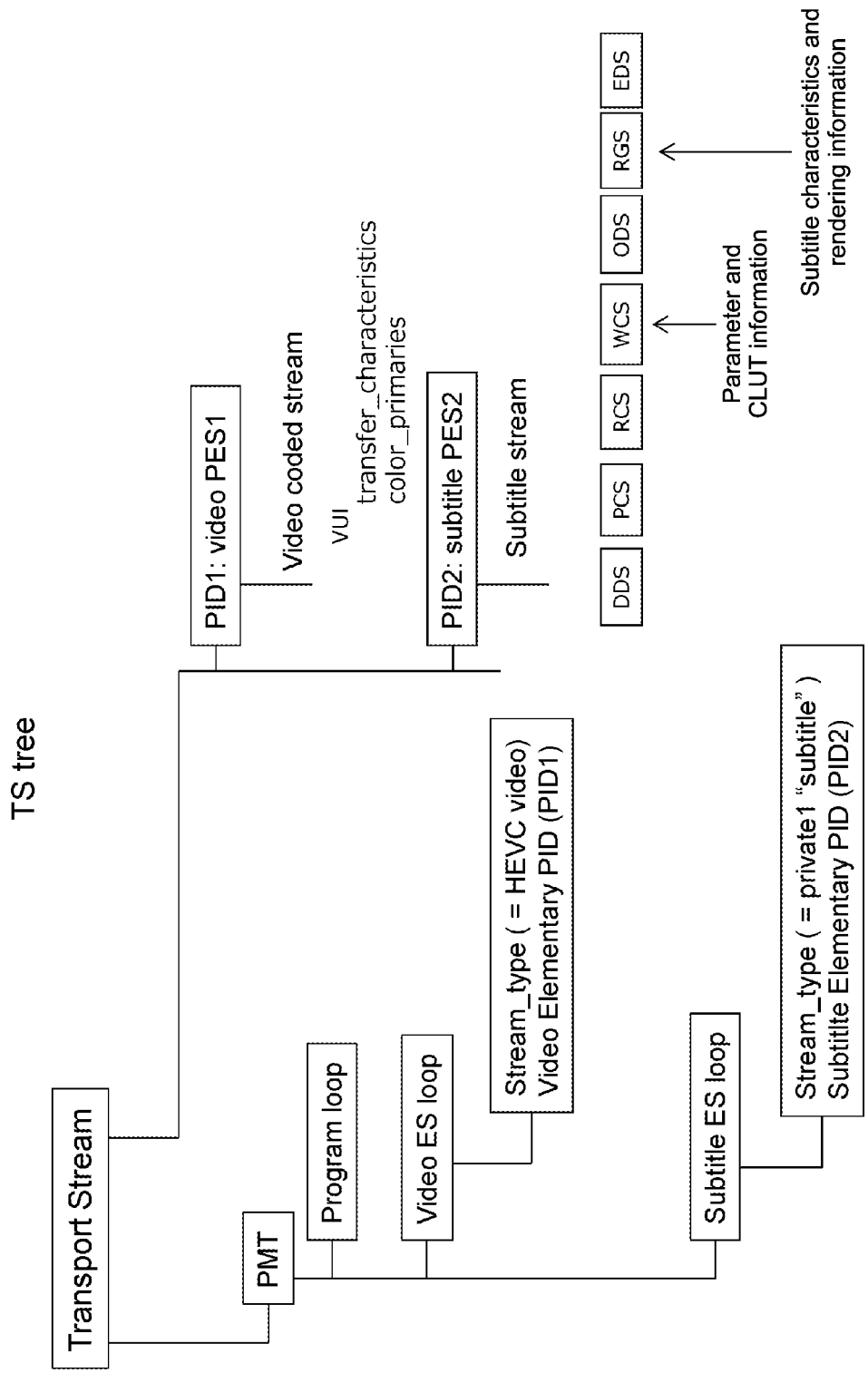
FIG. 13 is a diagram showing a configuration example of a transport stream.

FIG. 13 shows a configuration example of the transport stream TS. In this configuration example, "Video PES1" is present, "Video PES1" being a PES packet of the video stream and identified with PID1. Further, in this configuration example, "Subtitle PES2" is present, "Subtitle PES2" being a PES packet of the subtitle stream and identified with PID2.

The PES packet includes a PES header and a PES payload. In the PES packet of the video stream, a video coded stream is inserted into the PES payload. Color gamut identification information (color_primaries) and dynamic range information (transfer_characteristics) of transmitted video data are inserted into a region of VUI of an SPS NAL unit of an access unit. Further, in addition to the conventionally well-known segments such as DDS, PCS, RCS, ODS, and EDS, a WC segment (WCS) and a rendering guide segment (RGS) that are newly defined are inserted into the PES packet of the subtitle stream.

Further, the transport stream TS contains a PMT (Program Map Table) as PSI (Program Specific Information). The PSI is information describing to which program each elementary stream contained in the transport stream belongs. A program loop (Program loop) describing information related to the entire program is present in the PMT.

Further, in the PMT, an elementary stream loop including information related to each elementary stream is present. In this configuration example, a video elementary stream loop (video ES loop) corresponding to the video stream, and a subtitle elementary stream loop (Subtitle ES loop) corresponding to the subtitle stream are present.

In the video elementary stream loop (video ES loop), in order to correspond to the video stream, information such as a stream type and a PID (packet identifier) is disposed, and a descriptor describing information related to that video stream is also disposed. It is assumed that a value of "Stream_type" of the video stream is set to a value representing an HEVC video stream, for example, and that the PID information represents PID1 imparted to a PES packet "video PES1" of the video stream.

In the subtitle elementary stream loop (Subtitle ES loop), in order to correspond to the subtitle stream, information such as a stream type and a PID (packet identifier) is disposed, and a descriptor describing information related to that subtitle stream is also disposed. It is assumed that a value of "Stream_type" of the subtitle stream is set to a value representing a private stream, for example, and that the PID information represents PID2 imparted to a PES packet "Subtitle PES2" of the subtitle stream.

Operations of the transmission apparatus 100 shown in FIG. 2 will be simply described. The video data is supplied to the video encoder 102. This video data is SDR or HDR data and is provided with an SDR or HDR opto-electronic conversion characteristic.

In the video encoder 102, encoding such as MPEG4-AVC or HEVC is performed on the video data, and a video stream (PES stream) VS containing the encoded video data is generated. At that time, meta-information such as information (transfer_function) representing electro-optical conversion characteristics corresponding to the opto-electronic conversion characteristics of the video data or information (color_primaries) representing the color gamut of the video data is inserted into a region of VUI of an SPS NAL unit of an access unit (AU).

Further, the subtitle graphics data is supplied to the conversion section 103. This subtitle graphics data is SDR or HDR data and is provided with an SDR or HDR opto-electronic conversion characteristic. In the conversion section 103, the subtitle graphics data is converted to bitmap data. Together with the bitmap data, information of one or two or more bitmap conversion tables, which is assumed to be necessary on the reception side, is output from the conversion section 103.

Here, the bitmap conversion table is a bitmap conversion table containing conversion information of a color gamut and/or a luminance. In other words, this bitmap conversion table is not for simply converting the bitmap data into the subtitle graphics data but for converting a color gamut or a luminance together so as to be matched with the target video data that is video data of a superimposition destination.

The bitmap data and the bitmap conversion table information, which has been output from the conversion section 103, are supplied to the subtitle encoder 104. In the subtitle encoder 104, the bitmap data and the display control information are converted to various segments, and a subtitle stream SS including PES packets in which those segments are disposed in payloads thereof is generated.

The various segments include, in addition to the conventionally well-known segments such as DDS, PCS, RCS, ODS, and EDS, a WC segment (see FIGS. 8 to 10) and a rendering guide segment (see FIG. 12) that are newly defined. The WC segment contains information of the bitmap conversion table. Further, the rendering guide segment contains characteristic information of the subtitle graphics data before the conversion to the bitmap data, i.e., meta-information such as information of the color gamut or the dynamic range.

The video stream VS generated in the video encoder 102 is supplied to the system encoder 105. The subtitle stream SS generated in the subtitle encoder 104 is supplied to the system encoder 105. In the system encoder 105, the transport stream TS containing the video stream VS and the subtitle stream SS is generated. This transport stream TS is transmitted to the reception apparatus 200 by the transmission section 106 through broadcasting waves or network packets.

"Configuration Example of Reception Apparatus"

Figure 14:
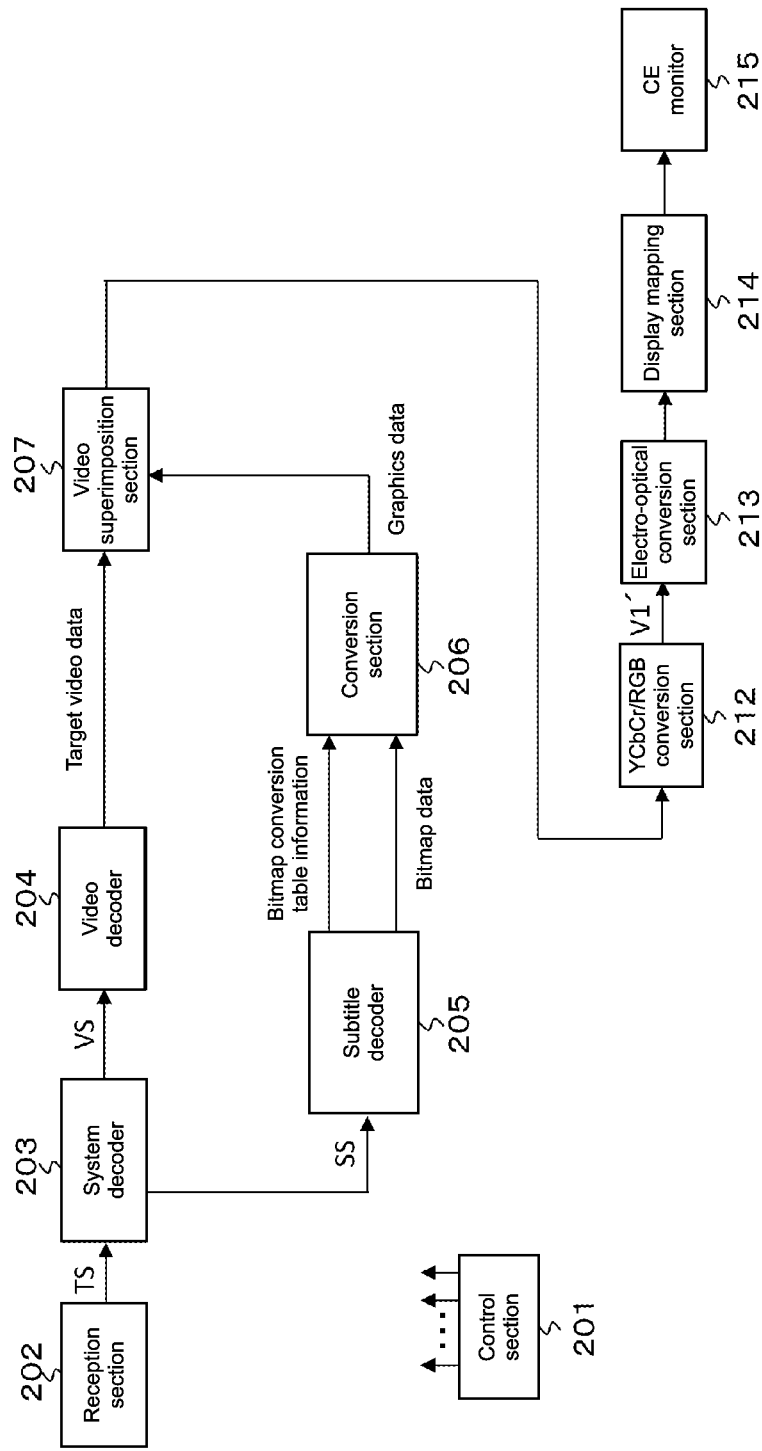
FIG. 14 is a block diagram showing a configuration example of a reception apparatus.

FIG. 14 shows a configuration example of the reception apparatus 200. The reception apparatus 200 includes a control section 201, a reception section 202, a system decoder 203, a video decoder 204, a subtitle decoder 205, a conversion section 206, and a video superimposition section 207. Further, the reception apparatus 200 includes a YCbCr/RGB conversion section 212, an electro-optical conversion section 213, a display mapping section 214, and a CE monitor 215.

The control section 201 includes a CPU (Central Processing Unit) and controls operations of respective sections of the reception apparatus 200 on the basis of a control program. The reception section 202 receives the transport stream TS, which is transmitted from the transmission apparatus 100 through broadcasting waves or network packets. The system decoder 203 extracts the video stream VS and the subtitle stream SS from the transport stream TS.

The video decoder 204 performs decoding processing on the video stream VS extracted in the system decoder 203 and obtains target video data. In this case, for the target video data, not only the video data transmitted from the transmission side but also video data obtained by performing conversion processing of a color gamut or a dynamic range thereon as appropriate are conceived. Further, the video decoder 204 extracts a parameter set and an SEI message inserted into each access unit forming the video stream VS, and transmits them to the control section 201.

The subtitle decoder 205 performs decoding processing on the subtitle stream SS extracted in the system decoder 203 and obtains the bitmap data and information of a predetermined number of, i.e., one or two or more bitmap conversion tables. Here, the information of a predetermined number of bitmap conversion tables is obtained from the WC segment (see FIGS. 8 to 10) described above. Further, at that time, characteristic information of the subtitle graphics data before the conversion to the bitmap data, i.e., meta-information such as information of a color gamut or a dynamic range is extracted from the rendering guide segment (see FIG. 12) and transmitted to the control section 201.

The conversion section 206 converts the bitmap data to subtitle graphics data by using a matched bitmap conversion table out of the predetermined number of bitmap conversion tables. In this case, the conversion section 206 determines a matched bitmap conversion table on the basis of the matching characteristic information ("subtitle_dynamic_range_type", "subtitle_color_gamut", "target_video_dynamic_range_type", "target video color gamut") (see FIG. 8), which is added to each bitmap conversion table.

The conversion section 206 considers the following bitmap conversion table as a matched one, in which a dynamic range and a color gamut represented by "subtitle_dynamic_range_type" and "subtitle_color_gamut" coincide with a dynamic range and a color gamut of the subtitle graphics data before the conversion to the bitmap data, and a dynamic range and a color gamut represented by "target_video_dynamic_range_type" and "target_video_color_gamut" coincide with a dynamic range and a color gamut of the target video data.

In this case, the dynamic range and the color gamut of the subtitle graphics data before the conversion to the bitmap data are grasped from the characteristic information (the information of a color gamut or a dynamic range) of the subtitle graphics data before the conversion to the bitmap data, the characteristic information being extracted from the rendering guide segment (see FIG. 12), as described above.

FIG. 15 shows a selection example of the bitmap conversion table. The example shown in the figure is an example of a case where the WC segment contains information of five bitmap conversion tables (CLUT 1 to 5) respectively having "CLUT_entry_id" of 1 to 5, which are shown in the example of FIG. 11 described above. Further, the example shown in the figure is an example in a case where a dynamic range and a color gamut of the subtitle graphics data before the conversion to the bitmap data are respectively "SDR by gamma" and "BT.709", and a dynamic range and a color gamut of the target video data are respectively "HDR by HLG" and "BT.2020". In this case, as shown in the figure, the CLUT 3 is selected as a matched bitmap conversion table.

Figure 5:
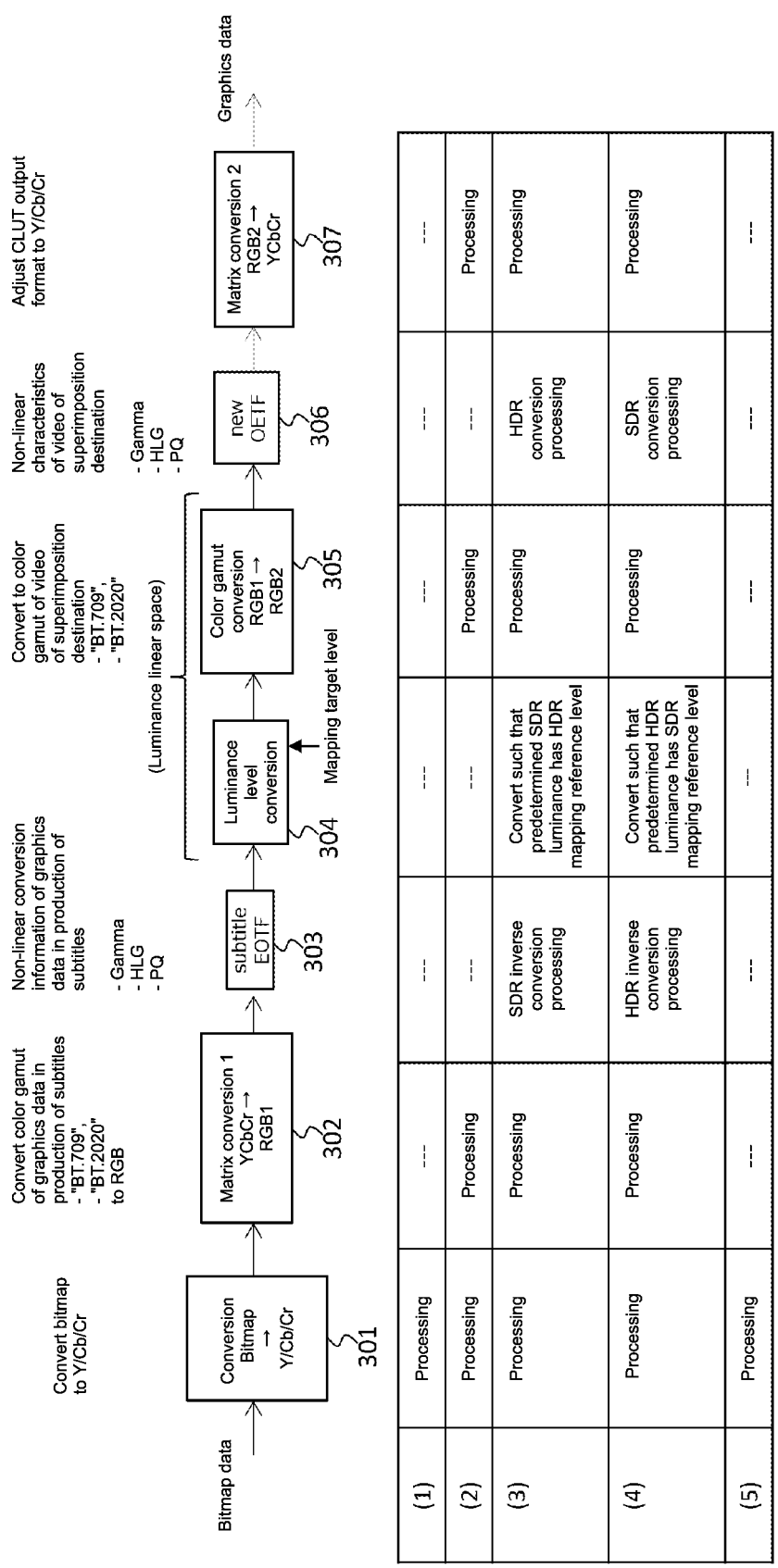
FIG. 5 is a diagram for describing details of conversion functions that are necessary on a reception side (conversion functions of the bitmap conversion table).

It should be noted that the conversion section 206 is assumed to have the first conversion function 301 to the seventh conversion function 307 shown in FIG. 5 described above. When there is no matched one in the bitmap conversion tables contained in the WC segment, the conversion section 206 generates from the bitmap data the subtitle graphics data having characteristics matched with those of the target video data of a superimposition destination by using a necessary conversion function out of the first conversion function 301 to the seventh conversion function 307, without using the bitmap conversion tables.

Referring back to FIG. 14, the video superimposition section 207 superimposes the subtitle graphics data output from the conversion section 206 on the target video data output from the video decoder 204. The YCbCr/RGB conversion section 212 converts a video data V1', on which the subtitle graphics data is superimposed, from the YCbCr (luminance/color difference) domain to the RGB domain. In this case, the YCbCr/RGB conversion section 212 performs conversion on the basis of the color gamut identification information by using a conversion formula corresponding to the color gamut.

The electro-optical conversion section 213 performs electro-optical conversion on the video data V1' converted to the RGB domain by applying an electro-optical conversion characteristic, which corresponds to the opto-electronic conversion characteristic applied to the video data V1', and obtains display video data for displaying images. The display mapping section 214 performs display luminance adjustment on the display video data, the display luminance adjustment corresponding to the maximum luminance display capability of the CE monitor 215, or the like. The CE monitor 215 displays images on the basis of the display video data on which the display luminance adjustment is performed. The CE monitor 215 includes, for example, an LCD (Liquid Crystal Display) or an organic EL display (organic electroluminescence display).

Operations of the reception apparatus 200 shown in FIG. 14 will be simply described. In the reception section 202, the transport stream TS transmitted from the transmission apparatus 100 through broadcasting waves or network packets is received. The transport stream TS is supplied to the system decoder 203. In the system decoder 203, a video stream VS and a subtitle stream SS are extracted from the transport stream TS.

The video stream VS extracted in the system decoder 203 is supplied to the video decoder 204. In the video decoder 204, the video stream VS is subjected to decoding processing, and target video data is obtained. In this case, for the target video data, not only the video data transmitted from the transmission side but also video data obtained by performing conversion processing of a color gamut or a dynamic range thereon as appropriate are conceived.

The subtitle stream SS extracted in the system decoder 203 is supplied to the subtitle decoder 205. In the subtitle decoder 205, decoding processing is performed on the subtitle stream SS, and bitmap data and information of a predetermined number of bitmap conversion tables are obtained. The information of a predetermined number of bitmap conversion tables is obtained from the WC segment (see FIGS. 8 to 10).

Further, at that time, characteristic information of subtitle graphics data before conversion to the bitmap data, i.e., meta-information such as information of a color gamut or a dynamic range is extracted from the rendering guide segment (see FIG. 12) and transmitted to the control section 201.

The bitmap data and the information of a predetermined number of bitmap conversion tables, which are obtained in the subtitle decoder 205, are supplied to the conversion section 206. In the conversion section 206, under the control of the control section 201, a matched bitmap conversion table is selected from the predetermined number of bitmap conversion tables. In the conversion section 206, a matched bitmap conversion table is determined on the basis of the matching characteristic information ("subtitle_dynamic_range_type", "subtitle_color_gamut", "target_video_dynamic_range_type", "target_video_color_gamut") (see FIG. 8), which is added to each bitmap conversion table.

In the conversion section 206, the matched bitmap conversion table is then used to convert the bitmap data to the subtitle graphics data. A color gamut and a dynamic range of the subtitle graphics data thus converted are matched with a color gamut and a dynamic range of the target video data obtained in the video decoder 204.

It should be noted that, in the conversion section 206, when there is no matched one in the transmitted bitmap conversion tables, a necessary conversion function out of the provided first conversion function 301 to seventh conversion function 307 (see FIG. 5) is used through determination of the reception side, and the subtitle graphics data having characteristics matched with those of the target video data of a superimposition destination is generated from the bitmap data.

The target video data obtained in the video decoder 204 is supplied to the video superimposition section 207. Further, the subtitle graphics data obtained in the conversion section 206 is supplied to the video superimposition section 207. In the video superimposition section 207, the subtitle graphics data is superimposed on the target video data. In this case, the subtitle graphics data is mixed with the video data at a predetermined ratio. Here, the mixing ratio is based on the T-Value.

A video data V1', which is obtained in the video superimposition section 207 and on which the subtitle graphics data is superimposed, is converted from the YCbCr (luminance/color difference) domain to the RGB domain in the YCbCr/RGB conversion section 212, and supplied to the electro-optical conversion section 213. In the electro-optical conversion section 213, electro-optical conversion is performed on the video data V1' by applying an electro-optical conversion characteristic, which corresponds to the opto-electronic conversion characteristic applied to the video data V1', and display video data for displaying images is obtained.

The display video data is supplied to the display mapping section 214. In this display mapping section 214, display luminance adjustment is performed on the display video data, the display luminance adjustment corresponding to the maximum luminance display capability of the CE monitor 215, or the like. The display video data on which the display luminance adjustment is thus performed is supplied to the CE monitor 215. On the CE monitor 215, images are displayed on the basis of the display video data.

As described above, in the transmission and reception system 10 shown in FIG. 1, the subtitle stream transmitted from the transmission side to the reception side includes the bitmap conversion table containing the conversion information of a color gamut and/or a luminance. Therefore, the reception side can easily obtain subtitle graphics data having characteristics matched with those of target video data of a superimposition destination by just converting the bitmap data to the subtitle graphics data by using the bitmap conversion table. This enables a processing load on the reception side to be alleviated.

Further, in the transmission and reception system 10 shown in FIG. 1, the characteristic information of the subtitle graphics data before the conversion to the bitmap data is inserted into the subtitle stream transmitted from the transmission side to the reception side. Therefore, the reception side can easily grasp the characteristics of the subtitle graphics data before the conversion to the bitmap data.

2. Modified Example

It should be noted that in the embodiment described above, the example in which the container is the transport stream (MPEG-2 TS) has been described. However, in the present technology, the transport is not limited to the TS, and the layer of a video can be achieved by the identical method also in a case of another packet, e.g., ISOBMFF or MMT.

Further, the present technology can have the following configurations.

(1) A transmission apparatus, including:
a video encoder section that generates a video stream including video data;
a subtitle encoder section that generates a subtitle stream including bitmap data, the bitmap data being obtained by converting subtitle graphics data; and
a transmission section that transmits a container having a predetermined format containing the video stream and the subtitle stream, the subtitle stream including a bitmap conversion table containing conversion information of a color gamut and/or a luminance.

(2) The transmission apparatus according to (1), in which the subtitle stream includes a plurality of bitmap conversion tables each containing the conversion information different from one another.

(3) The transmission apparatus according to (2), in which each of the plurality of bitmap conversion tables additionally contains matching characteristic information of the subtitle graphics data and target video data.

(4) The transmission apparatus according to any one of (1) to (3), further including an information insertion section that inserts characteristic information of the subtitle graphics data before conversion to the bitmap data into the subtitle stream.

(5) A transmission method, including:

a video encoding step of generating, by a video encoder section, a video stream including video data;

a subtitle encoding step of generating, by a subtitle encoder section, a subtitle stream including bitmap data, the bitmap data being obtained by converting subtitle graphics data; and a transmission step of transmitting, by a transmission section, a container having a predetermined format containing the video stream and the subtitle stream, the subtitle stream including a bitmap conversion table containing conversion information of a color gamut and/or a luminance.

(6) A reception apparatus, including:

a reception section that receives a container having a predetermined format containing a video stream and a subtitle stream, the video stream including video data, the subtitle stream including bitmap data obtained by converting subtitle graphics data, the subtitle stream including a bitmap conversion table containing conversion information of a color gamut and/or a luminance; and a control section that controls processing of decoding the video stream to obtain target video data, processing of decoding the subtitle stream to obtain the bitmap data and the bitmap conversion table, processing of converting the bitmap data to the subtitle graphics data by using the bitmap conversion table, and processing of superimposing the subtitle graphics data on the target video data.

(7) The reception apparatus according to (6), in which the subtitle stream includes a plurality of bitmap conversion tables each containing the conversion information different from one another, and in the processing of converting the bitmap data to the subtitle graphics data, out of the plurality of bitmap conversion tables, a bitmap conversion table matched with characteristics of the subtitle graphics data before conversion to the bitmap data and the target video data is used.

(8) The reception apparatus according to (7), in which characteristic information of the subtitle graphics data before conversion to the bitmap data is inserted into the subtitle stream, and in the processing of converting the bitmap data to the subtitle graphics data, the characteristic of the subtitle graphics data before conversion to the bitmap data is determined on the basis of the characteristic information inserted into the subtitle stream.

(9) The reception apparatus according to any one of (6) to (8), in which in the processing of converting the bitmap data to the subtitle graphics data, when the bitmap conversion table is not matched with characteristics of the subtitle graphics data before conversion to the bitmap data and the target video data, the bitmap data is converted to the subtitle graphics data to be matched with the characteristics without using the bitmap conversion table.

(10) A reception method, including:

a reception step of receiving, by a reception section, a container having a predetermined format containing a video stream and a subtitle stream, the video stream including video data, the subtitle stream including bitmap data obtained by converting subtitle graphics data, the subtitle stream including a bitmap conversion table containing conversion information of a color gamut and/or a luminance; and a control step of controlling, by a control section, processing of decoding the video stream to obtain target video data, processing of decoding the subtitle stream to obtain the bitmap data and the bitmap conversion table, processing of converting the bitmap data to the subtitle graphics data by using the bitmap conversion table, and processing of superimposing the subtitle graphics data on the target video data.

A main feature of the present technology is as follows: a subtitle stream transmitted from a transmission side to a reception side includes a bitmap conversion table containing conversion information of a color gamut and/or a luminance, so that the reception side can easily obtain subtitle graphics data having characteristics matched with those of target video data of a superimposition destination by just converting bitmap data to subtitle graphics data by using the bitmap conversion table, and this enables a processing load on the reception side to be alleviated (see FIGS. 2, 8, and 9).

REFERENCE SIGNS LIST

10 transmission and reception system
100 transmission apparatus
101 control section
102 video encoder
103 conversion section
104 subtitle encoder
105 system encoder
106 transmission section
200 reception apparatus
201 control section
202 reception section
203 system decoder
204 video decoder
205 subtitle decoder
206 conversion section
207 video superimposition section
212 YCbCr/RGB conversion section
213 electro-optical conversion section
214 display mapping section
215 CE monitor

The invention claimed is:

1. A reception apparatus, comprising:
reception circuitry configured to:
receive a container that includes a video stream and a subtitle stream,
the video stream including video data,
the subtitle stream including bitmap data, color conversion information, and characteristic information,
the color conversion information including a color table for converting the bitmap data into subtitle graphics data, and
the characteristic information including meta-information indicating a color gamut and a dynamic range of the subtitle graphics data; and processing circuitry configured to:
- decode the video stream to obtain the video data;
- decode the subtitle stream to obtain the bitmap data, the color conversion information, and the characteristic information;
- convert the bitmap data to obtain the subtitle graphics data based on the color conversion information and the characteristic information; and
- superimpose the subtitle graphics data on the video data.

2. The reception apparatus according to claim 1, wherein the processing circuitry is configured to convert a color gamut of the subtitle graphics data based on the characteristic information.

3. The reception apparatus according to claim 1, wherein the processing circuitry is configured to convert a dynamic range of the subtitle graphics data by applying an HDR opto-electronic conversion based on the characteristic information.

4. The reception apparatus according to claim 1, wherein the processing circuitry is configured to perform an electro-optical conversion on the video data to obtain display video data.

5. The reception apparatus according to claim 4, wherein the processing circuitry is configured to perform a display luminance adjustment on the display video data.

6. The reception apparatus according to claim 1, wherein the color conversion information includes multiple color tables in association with respective sets of color gamut and dynamic range, and
the processing circuitry is configured to apply one of the color tables when a corresponding set of the sets of color gamut and dynamic range associated with the one of the color tables matches characteristics of the video data.

7. The reception apparatus according to claim 6, wherein the processing circuitry is configured to, when none of the sets of color gamut and dynamic range matches the characteristics of the video data, convert the bitmap data to the subtitle graphics data without using the color tables.

8. The reception apparatus according to claim 1, wherein the color gamut of the subtitle graphics data includes ITU-R Rec BT.709 or ITU-R Rec BT.2020, and
the dynamic range of the subtitle graphics data includes SDR or HDR.

9. A reception method, comprising:
receiving, by reception circuitry of a reception apparatus, a container that includes a video stream and a subtitle stream,
- the video stream including video data,
- the subtitle stream including bitmap data, color conversion information, and characteristic information,
- the color conversion information including a color table for converting the bitmap data into subtitle graphics data,
- the characteristic information including meta-information indicating a color gamut and a dynamic range of the subtitle graphics data;
decoding the video stream to obtain the video data;
decoding the subtitle stream to obtain the bitmap data, the color conversion information, and the characteristic information;
converting, by processing circuitry of the reception apparatus, the bitmap data to the subtitle graphics data based on the color conversion information and the characteristic information; and
superimposing the subtitle graphics data on the target video data.

10. The reception method according to claim 9, further comprising:
converting a color gamut of the subtitle graphics data based on the characteristic information.

11. The reception method according to claim 9, further comprising:
converting a dynamic range of the subtitle graphics data by applying an HDR opto-electronic conversion based on the characteristic information.

12. The reception method according to claim 9, further comprising:
performing an electro-optical conversion on the video data to obtain display video data.

13. The reception method according to claim 12, further comprising:
performing a display luminance adjustment on the display video data.

14. The reception method according to claim 9, wherein the color conversion information includes multiple color tables in association with respective sets of color gamut and dynamic range, and
the method further comprises applying one of the color tables when a corresponding set of the sets of color gamut and dynamic range associated with the one of the color tables matches characteristics of the video data.

15. The reception method according to claim 14, further comprising:
when none of the sets of color gamut and dynamic range matches the characteristics of the video data, converting the bitmap data to the subtitle graphics data without using the color tables.

16. The reception method according to claim 9, wherein the color gamut of the subtitle graphics data includes ITU-R Rec BT.709 or ITU-R Rec BT.2020, and
the dynamic range of the subtitle graphics data includes SDR or HDR.

17. A non-transitory computer-readable medium storing instructions which, when executed by processing circuitry, cause the processing circuitry to control performance of a reception method, and the reception method comprising:
receiving a container that includes a video stream and a subtitle stream,
- the video stream including video data,
- the subtitle stream including bitmap data, color conversion information, and characteristic information,
- the color conversion information including a color table for converting the bitmap data into subtitle graphics data,
- the characteristic information including meta-information indicating a color gamut and a dynamic range of the subtitle graphics data;
decoding the video stream to obtain the video data;
decoding the subtitle stream to obtain the bitmap data, the color conversion information, and the characteristic information;
converting the bitmap data to the subtitle graphics data based on the color conversion information and the characteristic information; and
superimposing the subtitle graphics data on the target video data.

18. The non-transitory computer-readable medium according to claim 17, wherein the reception method further comprises:

converting a color gamut of the subtitle graphics data based on the characteristic information.

19. The non-transitory computer-readable medium according to claim 17, wherein the reception method further comprises:
converting a dynamic range of the subtitle graphics data by applying an HDR opto-electronic conversion based on the characteristic information.

20. The non-transitory computer-readable medium according to claim 17, wherein the reception method further comprises:
performing an electro-optical conversion on the video data to obtain display video data.

\* \* \* \* \*